United States Patent [19]

Lakes

[11] 4,226,886
[45] Oct. 7, 1980

[54] SELF-METERING LIQUID RETENTIVE PAD AND PROCESS FOR PRODUCING SAME

[75] Inventor: A. Dale Lakes, Dayton, Ohio

[73] Assignee: Micro-Cel Systems, Inc., Dayton, Ohio

[21] Appl. No.: 12,948

[22] Filed: Feb. 16, 1979

[51] Int. Cl.$^2$ .................. B32B 3/26; B29D 7/02
[52] U.S. Cl. .................. 428/304; 101/333; 264/45.9; 264/49; 428/305; 428/306; 428/909
[58] Field of Search .................. 521/61, 69; 264/45.1, 264/45.5, 45.9, 46.4, 49; 428/304, 305, 306, 307, 908, 909; 101/333

[56] References Cited

U.S. PATENT DOCUMENTS

| 3,253,542 | 5/1966 | McDonough | 264/49 |
| 3,536,796 | 10/1970 | Rock | 264/49 |
| 3,640,829 | 2/1972 | Elton | 428/304 |
| 3,718,532 | 2/1973 | Hayes, Jr. | 428/305 |
| 3,898,360 | 8/1975 | Newmann et al. | 428/305 |
| 3,928,521 | 12/1975 | Haren et al. | 521/61 |
| 3,971,315 | 7/1976 | Hansen | 264/46.4 |
| 4,157,424 | 6/1979 | Boutle | 521/61 |

Primary Examiner—William J. Van Balen
Attorney, Agent, or Firm—Quaintance, Murphy & Richardson

[57] ABSTRACT

The present invention relates to a pad capable of high liquid retention and capable of self-metering of liquid from the pad upon application of pressure. Such pads are highly desirable in lubricating applications and serve well as printers and ink reservoir for computers, markers and printing machines. The process comprises mixing a void former, typically a non-reactive salt of a size range chosen between 2 and 450 microns with a polymeric material in a weight ratio of 2.5:1 to 10:1 salt to polymer. The polymer is heated and the salt dispersed therein to form a salt-polymer composite. The composite is fed to an extruder and extruded to a desired shape, a dense skin being formed on the surface of the extruded polymer. Subsequently, the extruded polymer is cut, the salt is leached from the polymeric matric with a suitable solvent, and the leached extruded polymeric matrix is dried. The skin layer has narrower channels and a lower void volume than the adjacent reservoir column. The pad thus formed is then filled with liquids using conventional methods.

14 Claims, 7 Drawing Figures

4,226,886

SELF-METERING LIQUID RETENTIVE PAD AND PROCESS FOR PRODUCING SAME

BACKGROUND OF THE INVENTION

Retentive pads which not only retain a large volume of liquid, but are capable of self-metering have long been desired for lubricating and marking applications. Modern technology in these fields has particularly sought pads which meet these criteria and additionally are sufficiently economical in manufacture that they can be discarded after use. Obviously, long-life pads with lifetimes of 60,000 to 200,000 impressions are highly desirable. Ideally, this type of lifetime should be almost unrestrictive for the type of liquid and the nature of the pad material in order to have the widest application for a myriad of uses.

There have been attempts to produce pads which are self-metering and retentive.

U.S. Pat. No. 3,253,542 to McDonough produced an inked roller which was a substantial improvement over previous rollers and gave thousands of ink transfer operations. However, the process requires a compatible plasticizer for the resin to form a plastisol. Salt is added to the plastisol prior to the formation of molding and later leached out. The molding operation was particularly time consuming. Also, the plastisol must be compatible with the filler liquid, in this case ink vehicle; and this severely limits wide applicability.

U.S. Pat. No. 3,971,315 to Hansen discloses a two layer structure which provides a superior reservoir system. However, compatibility between the thermoplastic resin, plasticizer for plastisol formation and ink which is dispersed in the macroporous reservoir layer is necessary and limits wide applicability. While greater fluid retention is available, surface metering is not available here.

Therefore, it is an object of the present invention to produce a liquid retentive pad that can largely be produced from a wide variety of materials.

Furthermore, it is an object of the present invention to produce a pad which can be used with a wide variety of liquids tailored for specific uses and not restricted by the compositional requirements of the pad.

It is an additional object to produce a self-metering retentive pad in an efficient, rapid manner.

It is also an object of the present invention to produce multi-layered ink printers suitable for both low and high centrifugal or surface speed printing operations.

Yet another object of the present invention is to produce extrudates from extrusion molding processing which contain a high proportion of void formers.

It is also an object of the present invention to produce a self-metering retentive pad in a manner which results in a consistent density from part to part.

SUMMARY OF THE INVENTION

The above and other objects are accomplished according to the present invention by providing a process comprising the steps of:

mixing salt of a size of 2 to 450 microns with a polymeric material in a weight ratio of 2.5:1 to 10:1 salt to polymer;

heating the polymer to a molten state and dispersing the salt to form a salt-polymer composite;

feeding the composite to an extruder and extruding to desired shape, whereby a more dense skin portion is formed on the surface of the extruded polymeric matrix;

cutting and finishing the extruded polymeric matrix to desired pad size;

leaching out the salt with solvent; and drying the extruded matrix to evaporate leaching solvent.

A unique aspect of this invention is the use of extrusion molding for a salt laden polymer composition which is not characteristic of conventional molten or softened polymers for the extrusion art process.

The invention may employ additional salt-polymer composites which are extruded onto the first extruded layer. In another embodiment the layers may be extruded onto a profile. A wide variety of liquids may be impregnated into the pad depending on the ultimate use for which the pad is intended. Other finishing hardware may also be affixed to the pad which is desirable for the function of the pad in use.

The use process is essentially a pumping process. The polymer must be sufficiently elastomeric to pump upon pressure. The metering rate is dependent on the viscosity of the contained fluid, on the size of the voids in the skin, on the channel sizes in the reservoir, and on the degree of elasticity of the compressible porous pad. The depth of the skin layer is also important.

The polymeric materials suitable for use in the present invention are many. Thermoplastic elastomeric resins are used in the basic process. These include a vast number of types making it possible to select almost any resin property for a wide variety of uses. Suitable resins include polyester, polyolefin, polyurethane, ethylene vinyl acetate, 1,2-polybutadiene, styrenebutadiene, polyvinyl chloride, SAN, ABS, ethylenepropylene, styrene-isoprene, styrene-polyolefin, CAB, Telfon FEP, nylon, polyethylene and polypropylene.

Also heat curable plasticizable grades of gum stock elastomers may be used such as NBR, SBR, butyl, acrylic, polyurethane polychloroprene, fluorocarbon, silicon, natural rubber, polyisoprene, chlorinated polyethylene, ethylene-propylene, EPDM, PVC/NBR and ethylene-vinyl acetate. However, in order to use the low thermoplastic gum stock elastomers in the basic mixing and extrusion process, and in order to create a skin effect on the surface of the extruded pad, the elastomers must be plasticized sufficiently to cause the elastomer to flow under high shear and pressure during the mixing and extrusion steps. The flow occurs without the addition of any external heat to either the mixing vessel or the extruder. Also the plasticizer addition must not be sufficient to cause the formation of a true plastisol. The percentage of plasticizer added is typically in the range of 10–30% by weight of the gum stock elastomer. Colorants, flow aids, curing agents, etc., are optionally added during the mixing step. Crumb or powdered grades of elastomers are particularly suited for mixing with various void formers. It is important that the gum stock elastomers always be mixed and extruded at temperatures less than the temperature required for curing or cross-linking the elastomer, since curing will cause the elastomer-void former composite to become solid and retard the flow required for obtaining the pronounced skin effect. The extruded elastomer-void former composite is cut and finished to the desired pad size, then subjected to any required time-temperature cure cycle in a forced air oven before leaching out the void former with solvent as stated in the basic process for thermoplastic resins.

The thermoplastic resins used have a wide melting point range, typically between 75° and 175° C. Commercial extruders can handle any of these resins and plasticized gum stock elastomers. It should be pointed out that in order to achieve the maximum skin effect as a result of the extrusion process a thermoplastic resin should be used where possible instead of plasticized gum stock elastomers. Greater surface flow of the matrix forming material takes place when using the heat sensitive thermoplastic resins as compared to the use of gum stocks, since the application of heat markedly reduces the viscosity of the resinous materials and only marginally reduces the viscosity of gum stock materials.

A large choice of void-formers is also possible. The void former must not react with the polymeric composition. Aside from chemical inertness, cost, availability and ease of use determine the selection of void former. Typically, sodium nitrate, sodium chloride, magnesium sulfate and its hydrated forms and sugar have been used. Such common chemicals are easily obtained and can be easily obtained in sizes desired by the user. Size distributions of 2 to 450 microns are used, but preferably size ranges are specified for specific purposes. For instance, ranges of 2 to 38 and 38 to 450 microns have been used in formulating different speed ink rollers.

The ratio of the void former or salt to the polymer can vary widely. Ratios of 2.5:1 to 10:1 of salt to polymer are general. For specific applications the ratio can vary greatly. Additionally a layered product may employ different ratios in the different layers. In the case of a multitude of layers, the first layer extruded is the most extreme reservoir layer and farthest from the layer with the exposed skin which is contacted or pressed to meter the fluid. For example, a high-speed multi-layer ink printer has a first reservoir layer of large sized void formers in a weight ratio of typically 7:1 void former to resin and the metering layer has smaller void formers in a 4:1 ratio. The reservoir layer can vary greatly as from 10:1 to 5:1 and the metering layer from 5:1 to 3:1.

In the process it is important that the void-former and polymer composition be thoroughly mixed. High-shear type mixers such as Readco Sigma Blade Mixers have been used. Mixing speeds of 30 to 150 rpm and time periods of 3 to 30 minutes have been employed. During mixing, the composite may be heated, and then cooled and granulated prior to use in the extruder. Improper mixing results in both large holes and non-channeled areas in the extruded polymer matrix which are unacceptable. Testing for completeness of mixing is done by monitoring the torque of the mixer shaft at the controlled mixing temperature. Mixing is complete when the torque equilibrates and does not increase or decrease more than 10% over a 1 minute time span.

In the process, the polymer is mixed with the desired sized void-former in a Sigma Blade mixer. Heating, if applied, is generally from 75° to 176° C. The resultant salt-polymer composite is cooled. Granulating of the composite is typically done for composites which are prepared and stored for later use.

The composite is fed to the extruder at ambient to 205° C., and extruded alone or onto a profile. The through-put temperature is 48° to 205° C. and the exit temperature is 65° to 205° C. and is typically 10° C. lower than the through-put temperatures when using thermoplastic resins. At similar temperatures, times and speeds, additional composites may be simultaneously or subsequently extruded onto the first extruded composite. Simultaneous extrusion is preferred.

There are many commercial extruders on the market suitable for the practice of the present invention. HPM Corporation and Davis-Standard Division can supply technical literature. Typically, the extruder provides for heating and cooling and temperature control at inlet, outlet and through-put. The extruder also provides for venting or a vacuum to remove entrapped air and any gaseous by-products. This is very important in order to assure a reproducible density in the extrudate. Conventional methods of compression molding in a cavity do not result in a high percentage removal of entrapped air, sometimes causing extreme variations in molded product density and dimensions particularly on the molded part surfaces.

In extruding onto a profile, crosshead dies are used. Of course, the profile itself can be obtained by extruding with a straight-through die. The molten or softened salt-polymer composite passes through streamlined channels of ever-decreasing cross section traversing a 30 to 90 degree angle to effect alignment with the profile flow. With a pressure type die the profile is coated within the body of the die.

Simultaneous or coextrusion of multiple molten layers is used in making a multi-layer pad. Commercial extruders providing for four different molten composites are available.

Typical temperatures of coextrusion are the same as for single component extrusion. These temperatures are, of course, related to the nature of the thermoplastic resin or gum stock elastomer. The salt or void-formers is not affected by the temperatures employed, and, surprisingly, the presence of solid particles does not interfere with the success of extruding the molten or plasticized product.

The length of residence time in the extruder is influenced primarily by screw length to outer diameter ratio, the pitch and helix angle of the screw flights, the depth of the screw flights and the peripheral speed of the screw. L/D ratios of 10:1 to 32:1 and compression ratios of 1:1 to 5:1 are typical, but can be greatly varied as is known in the art.

The depth of the layers can vary greatly. Generally, a larger reservoir layer will provide for a longer life of the pad. The reservoir layer is preferably thicker than the outer layer. Ratios of 7:1 to 2:1 size of reservoir to metering layer are typical and pad sizes of ⅛ inches to 4 inches thickness or diameters are typical in the art.

While the term porous has been used in describing the voids of what are referred to as cells, it is preferable to consider that the polymer is a skeletal framework for a diverse network of interconnected channels. It is impossible to designate a typical pore diameter. Rather, it is more reasonable to indicate channel diameters and void percentages.

The extruded polymer void-former composite exhibits a skin on the outermost surface. The skin effect on the extruded polymer was unexpected, yet subsequently has proved to be significantly advantageous. While the presence of the void-former does not appear to affect the extrusion process, it does appear that the well-mixed salt-polymer composite undergoes a shift during contact with the die wall while under high pressure and temperature and that essentially all air pockets are removed from the composite as it is moved from the extruder feed hopper to the die opening. The polymer appears more concentrated at the surface of the extruded product, and the salt can be said to have migrated away from this surface.

Skin layer depths can vary greatly between different chemical types and grades of resins and plasticized elastomers and typically range between 20 and 150 microns. A skin layer may exist between layers of different composition and vary from 20 to 150 microns. A greater appreciation for the various physical characteristics of the product produced by the inventive process will be gained from a consideration of the figures, described later.

Typically, the skin layer has narrower channel diameters and a lower void volume. While great variation is possible in typical printing applications, channel sizes of infinitely small to 100 microns are typical and void volume to total volume percentages vary between 10 and 50 percent.

The reservoir area can also vary greatly and can be arranged proportionately. The most extreme reservoir area furthest from the skin can have channel sizes between infinitely small and 450 microns and void volume percentages between 60 and 86 percent. The channel sizes can be proportionately decreased toward the skin layer, with infinitely small to 100 microns ranges possible. Void volume percentages can vary from 10 to 50 percent in the skin layer.

The finishing steps of the extruded salt-polymer composite are dictated by the desired use. Cutting, shaping, forming indicia and affixing of handles, hubs, are well known in the art.

The extruded and leached composite may additionally be treated by conventional methods to form a stamp pad as illustrated in FIG. 7. The composite is form molded to receive the appropriate indicia. The skin on the indicia is unaltered by the molding and the portion without indicia has the channels and voids reduced. Thus, printing and metering are exclusively through the indicia. Molding is conventional but generally the temperature is between 75° and 205° C. and the residence time in the mold between 5 seconds and 15 minutes.

The void formers are leached from the extruded polymeric matrix by a suitable solvent which does not affect the polymer. Water soluble salts are typically used and warm water is a typical solvent. However, a wide variety of solvents may be employed. Preferably, the solvent does not hinder the final drying step. Washings may be employed to remove any excess solvent.

The leaching or removal of the void formers or salt is easily accomplished by a rapid flushing through the pad. With water soluble void-formers, warm water (generally between 45° and 55° C.) is an apt choice of leaching solvent.

The pads are conventionally dried, using ovens (generally at 45° to 95°) or air drying and subsequently filled with the desired fluid. Conventional filling techniques are employed, vacuum filling commonly practiced in ink-filling.

A wide variety of liquid fillers can be incorporated into the channels and contained in the reservoirs. Those skilled in the art are familiar with suitable fluids and manner of fillings which are conventional. Dyes, pigments, and other particles must be chosen of a size to pass through the outer skin layer.

By way of example from the many fluids available, commercially prepared inks from Frye Copy Systems, Inc. have been employed as have commercial oils from Dow Corning Corporation. Vacuum filling has typically been used for filling the pads.

The physical features of the products produced by the present invention are illustrated in the accompanying figures.

DESCRIPTION OF THE PREFERRED EMBODIMENTS

Figure 1:
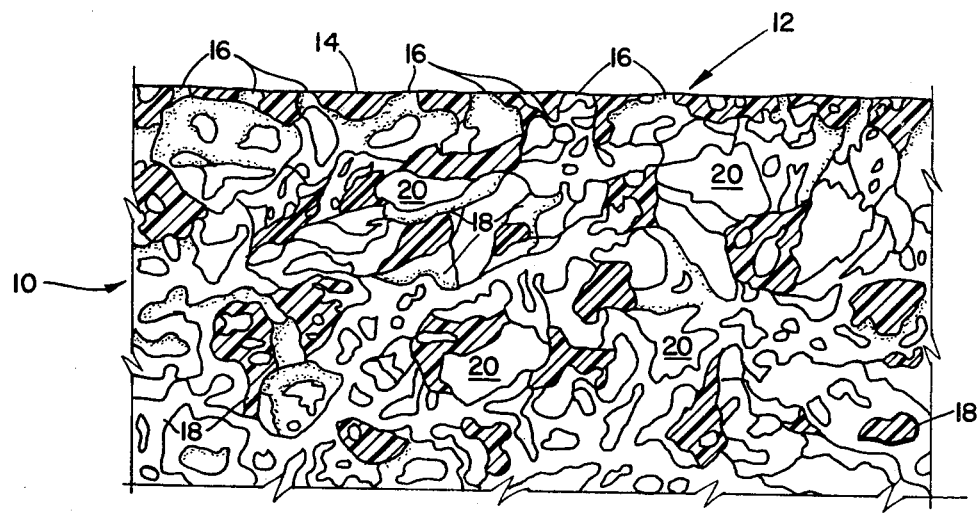
FIG. 1 is a photomicrograph of a marking pad produced according to the inventive process illustrating the existence of a surface skin on the outermost portion of the pad.

FIG. 1 is a reproduction of a photomicrograph taken of a section of a liquid-retentive pad 10 according to the present invention. An examination of FIG. 1 reveals that the outer surface 12 of the pad consists of a substantially continuous skin 14 punctuated by a series of very small openings 16. Below the skin level 14 there exists an open network or matrix of polymeric filaments 18 having therebetween a series of continuously connected channels 20 into which a suitable liquid can be inserted. It is to be noted from the photomicrograph that the means cross-section of the channels 20 is considerably larger than the apparent opening size of openings 16. This smaller size of openings 16 performs a self-metering function inasmuch as only a limited volume of liquid can exit through the series of small openings 16 when the pad 10 is placed under a particular force. This concentration of polymer at the surface 12 of the extruded product thereby providing the skin effect illustrated was an unexpected yet significantly advantageous result of the process employed.

Figure 2:
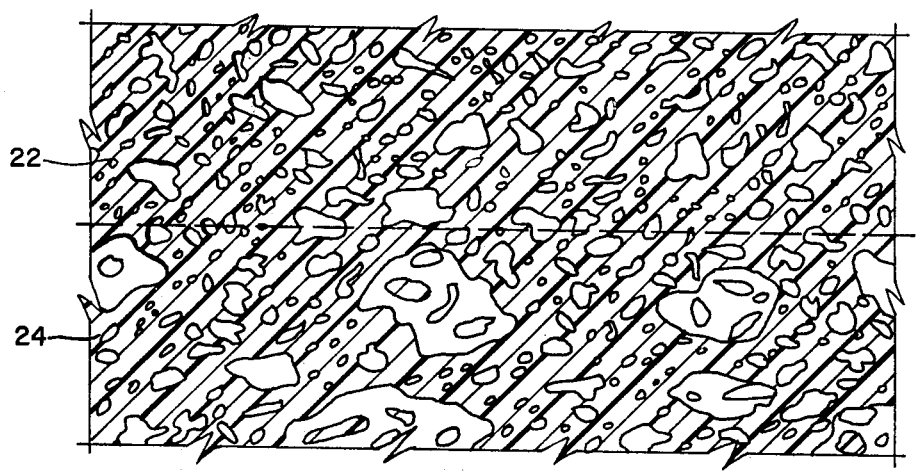
FIG. 2 is a photomicrograph of a pad produced according to the method of the present invention illustrating the boundary region between two adjacent layers of differing void volumes.

FIG. 2 is another reproduction of a photomicrograph illustrating the boundary between two differing regions of polymer wherein the concentration and size of the void former was varied so as to form a surface layer 22 and a reservoir layer 24. It will be noted that in the reservoir layer 24, the channels existent in the elastomeric matrix forming the pad are of significantly greater diameter and frequency, thereby permitting the greater subsequent storage of liquid.

The details of construction of each of the samples illustrated in FIGS. 1 and 2 are to be found in Examples I and II herein.

Figure 3:
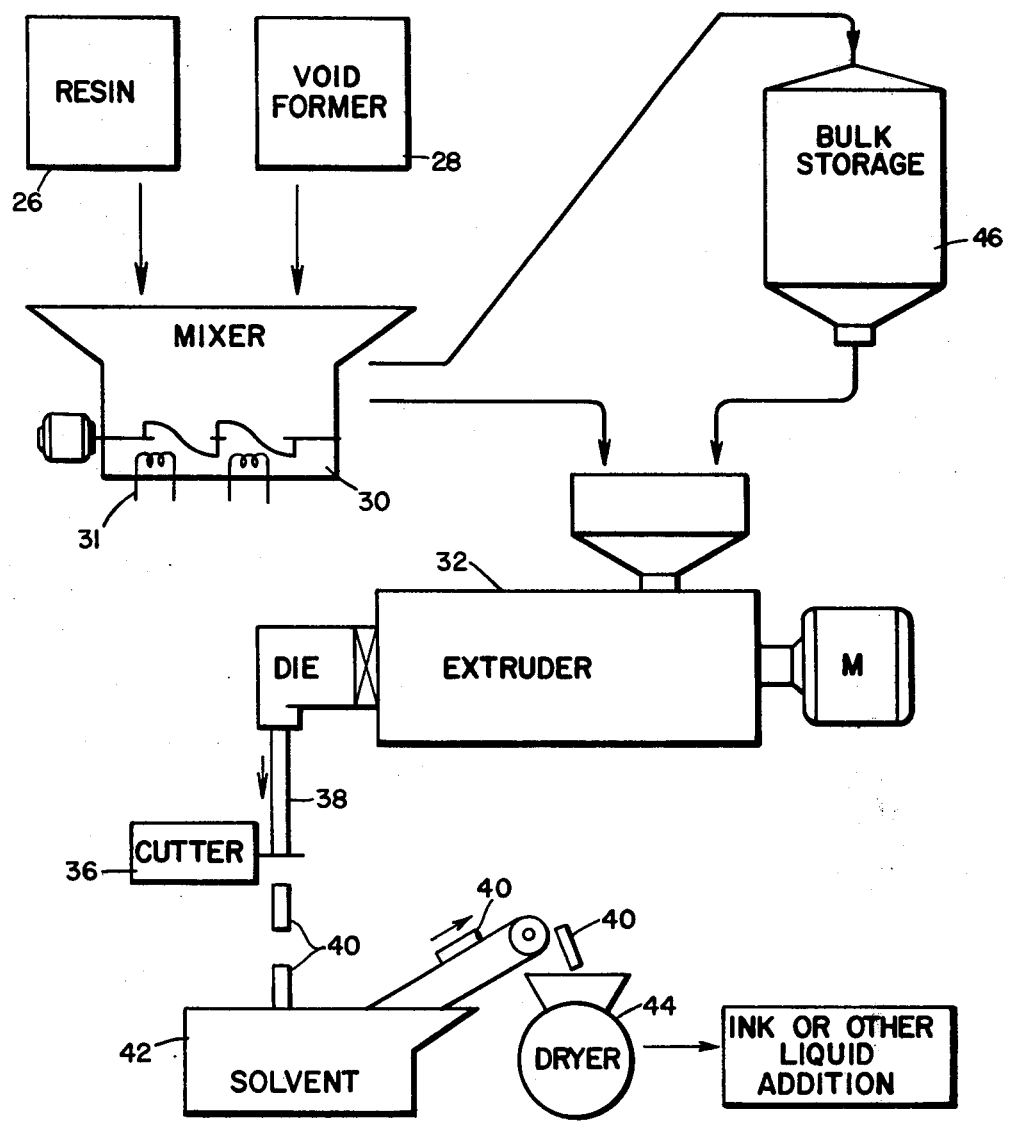
FIG. 3 is a flow diagram of the basic process of the invention.

FIG. 3 is a diagram of the general process performing liquid-retentive elements according to the present invention. In the most general case, a polymeric material 26 which can be either liquid or slab or particulate solid, and a void former 28 are mixed in a mixer 30, which can optionally include a heating means 31. The polymer and void forder are then fed from the mixer into extruder 32. The extruder 32 heats the polymer containing the void former to a molten state, and forces it out through an extrusion die 34 as a generally continuous process. A cutter 36 periodically severs the continuously-produced output of the extruder 38 into a series of discrete elements 40 adapted for use as liquid-retentive pads, rollers, or the like. The elements 40 are then inserted into a solvent bath 42 for leaching out the void former from the elements 40. The elements 40 are then removed from the solvent bath and dried in dryer 44. Subsequently, an ink or other desired liquid is inserted within the polymer matrix to form the finished product.

Variations on this general process include bulk storage means 46 for various mixtures of polymer and void former for later use according to the present invention. While FIG. 3 illustrates the use of but a single extruder and die, it will be appreciated that more than one extruder may feed a single die so as to create a layered product having two or even more layers with differing void volumes and/or channel sizes to serve various purposes. The leaching of the extruded product 38 in the solvent bath may be conventionally performed either before or after the product is periodically severed by the cutter, and may include mechanical agitation or manipulation steps so as to insure complete removal of the soluble void formed from the extruded product. The unleached product is more rigid and thus easier to shape. A discussion of the exact parameters employed in the various steps of the process is to be found in the foregoing summary of the invention, and in the subsequent examples.

Figure 4:
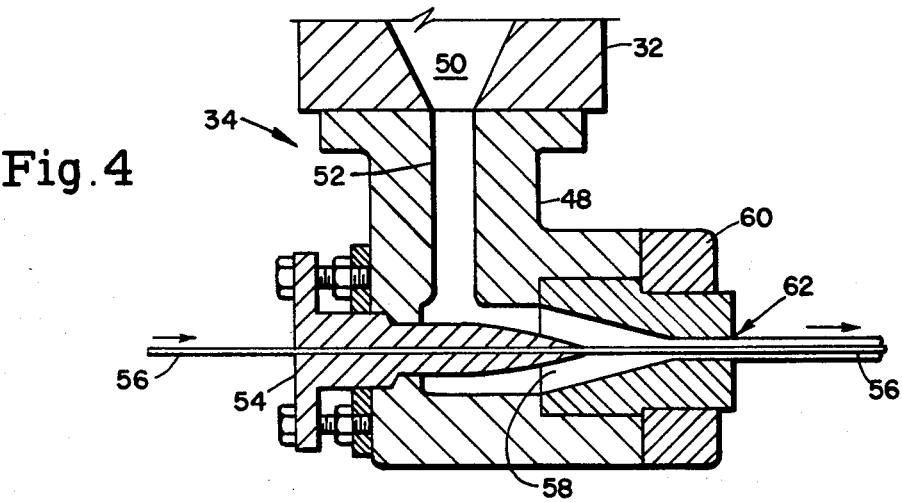
FIG. 4 is a sectional view of a cross-head die for use in the extrusion process of the present invention.

FIG. 4 is illustrative of one type of die 48, commonly known as a cross-head, which can be used in the present invention most advantageously to form a roller having an at least semi-rigid central member. As illustrated, the polymer melt 50 including the particulate void former exiting from extruder 32 is introduced into an orifice 54 which conducts the melt 50 so as to surround a guide or "point" 54. A rod or tubular member 56 is continuously inserted from the left through the point 54 and into cavity 58 where the melt 50 envelops the rod or tube 56. A portion of the melt 50 maintained in its plastic state by heater 60 then adheres to the moving rod or tube 56 and exits as a continuous layer of uniform thickness, the thickness being determined by the size of the die opening 62, the viscosity of the melt 50, and the rate of movement of rod or tube 56. While FIG. 4 illustrates the use of a 90 degree cross-head die for the production of a supported roller, 45 degree and 30 degree cross-head dies might also be similarly used. For the production of various other shapes according to the design intended, straight-through dies and offset dies might be used as well as cross-head dies. Of particular interest is the use of co-extrusion dies whereby a multi-layered product can be formed in a single step using two or more extruders feeding a single die.

Figure 5:
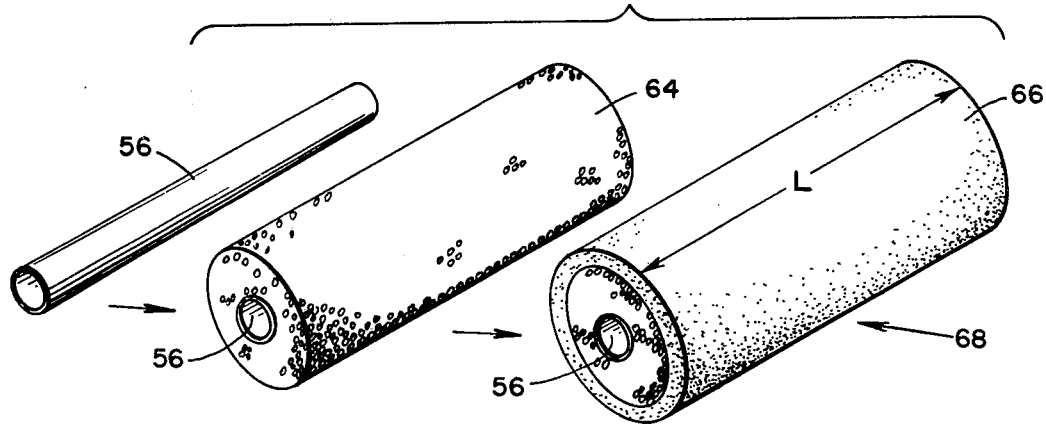
FIG. 5 illustrates various precursors in the formation of a product according to the present invention.

In FIG. 5, there is illustrated, by way of example, a tubular insert 56 which could be used as a central supporting member for a single-layered roller 64 or double-layered roller 66 by employing the method according to this invention. Subsequent to the extrusion of the polymer containing the void former onto the central supporting member 56, the product, as it exited from the extrusion die, is periodically severed into lengths (1) convenient to the ultimate utility of the roller 68. The roller is subsequently treated so as to remove the solvent, and an ink or other desired liquid is subsequently inserted by a vacuum or other process into the roller.

Figure 6:
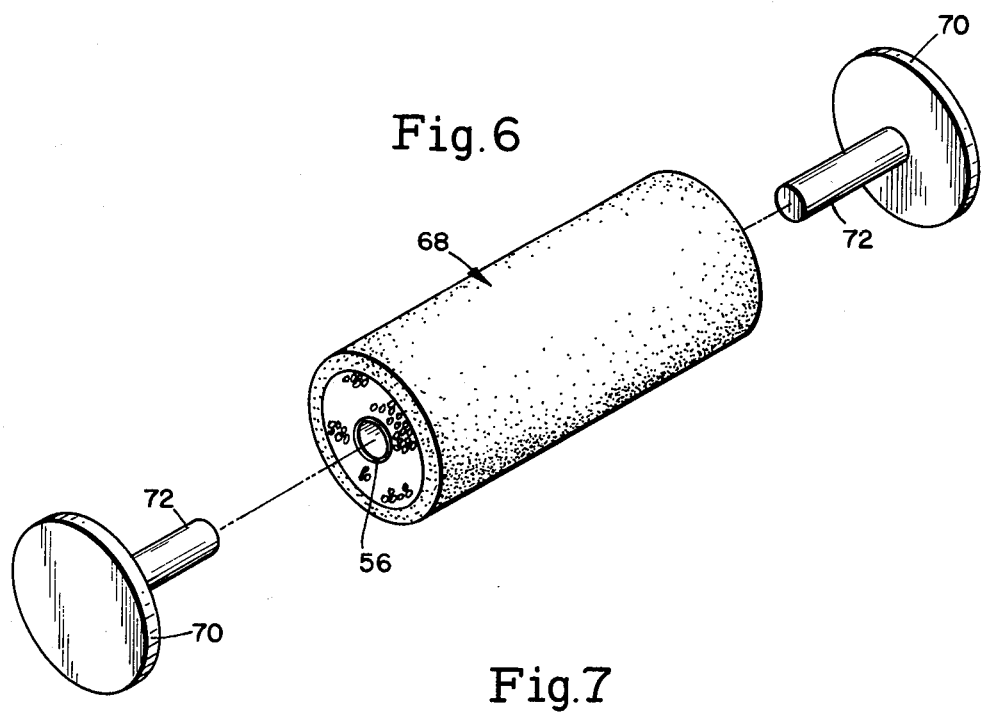
FIG. 6 is an exploded view of a roller produced according to the present invention.

As illustrated in FIG. 6, end caps 70 can then be attached to the roller by inserting the stub shafts 72 of each end cap within the hollow cylindrical supporting member 56. A close friction fit between the stub shafts 72 and hollow member 56 with the possible addition of a suitable cement maintains the end elements 70 in position. The end elements 70 prevent the liquid retained by the roller from exiting the ends of the roller, thereby insuring the desired self-metering pumping action across the cylindrical surface of roller 68.

Figure 7:
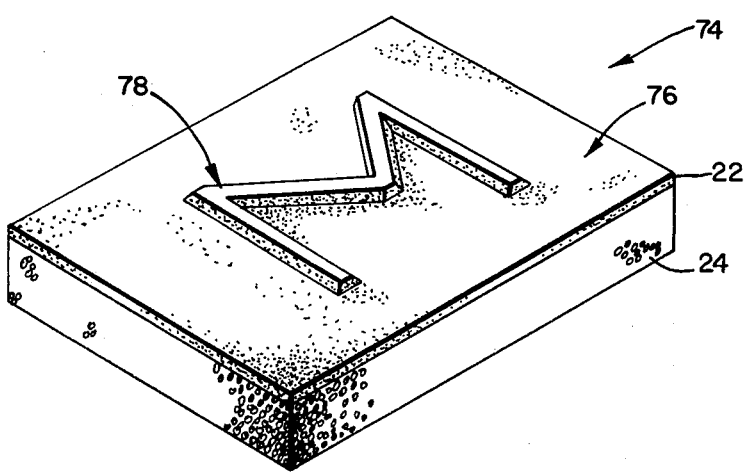
FIG. 7 is a view of a stamp pad with raised indicia.

FIG. 7 illustrates a finished stamp pad 74 comprising a surface layer 22 and a reservoir layer 24. The surface layer 22, after its initial formation, has been depressed and at least partially sealed in region 76 thus leaving undisturbed a raised indicia region 78. The self-metering function of the surface layer 22 is unchanged in region 78, while in region 76 the surface is relieved substantially to prevent the transpiration of liquid held within the pad 74.

The invention is further illustrated by the following examples in which all parts and percentages are by weight unless otherwise indicated. These nonlimiting examples are illustrative of certain embodiments designed to teach those skilled in the art how to practice the invention and to represent the best mode contemplated for carrying out the invention.

EXAMPLE I

A self-metering low peripheral speed single layer liquid retentive pad or roller is produced as follows. By weight 87.5 parts of sized particles of ground sodium nitrate from Croton Chemical Company are provided by mechanically sifting the salt through a 40 mesh screen. The sized particles (less than 450 microns) are thoroughly mixed with 12.5 parts of a thermoplastic extrusion grade polyurethane resin in a Sigma Balde type mixer having its jacket maintained at 170° to 178° C. during the mixing time of 12 to 15 minutes. The polyurethane resin used has a SA hardness value of 80-90 durometer.

The mixed salt-polymer composite is allowed to cool to 20° to 32° F. before granulating in a mechanical blade chopper to a composite particle size dimension of ⅛ inch maximum. The granulated composite is continuously fed to the extruder hopper where it is continuously extruded through a cross-head die to form the desired shape and size part.

The extruder uses a screw design having a 20:1 L/D ratio and a compression ratio of 1.5:1. The extruder barrel temperature is maintained at 196°-202° C. and the die temperatures maintained at 188°-194° C. The die pressure is controlled at 4,000 to 5,000 p.s.i. by varying the peripheral speed of the screw and by adjusting the barrel temperature up or down within the temperature range stated. The extruder barrel is vented to permit any entrapped air to escape from the composite as it is moved along the barrel toward the forming die. It is extremely important to permit the air to escape since entrapped air pockets will cause undesirable variation in the density of the saltpolymer composite.

The formed extrudate is periodically cut to size as it exits the die opening and the severed parts are guided to a cooling and leaching hot water tank where they are leached at a water temperature of 45° to 55° C. for a period of 24 to 48 hours. The residual salt is rinsed from the parts with tap water at room temperatures for 2 to 4 hours.

The rinsed microporous part is dried in an oven between 80° and 85° C. for a period of time required to dry off any residual rinse water. The microporous part is completed and ready for use as a pad or roller. The pad or roller may be conventionally filled with liquid such as ink by the method well known in the art.

EXAMPLE II

A self-metering high peripheral speed (420 FPM) multi-layer liquid retentive pad or roller is produced as follows. A granulated composite mix for use as the reservoir layer of the pad or roller is produced by preparing exactly the same salt-polymer composite as described in Example I.

A second granulated composite mix for use as a metering layer is prepared in exactly the same method as described in Example I except that 80 parts of 400 mesh (dimensions less than 38 microns) sodium nitrate and 20 parts by weight of the same polyurethane resin are used.

The granulated composites are simultaneously fed to two separate extruders which extrude through a single co-extrusion die. The extruders attach to the die at a 90° angle to each other with the reservoir layer composite passing straight through the die body and opening, and the metering layer composite entering the die at a 90° angle to the reservoir composite. The two composites flow together within the die body and exit the die opening as a layered composite. The extruding conditions are the same for each extruder and are the same as the conditions shown in Example I except that the ratio of metering layer composite to reservoir layer composite delivered to the die is controlled by varying the ratio of the peripheral screw speed of one extruder to that of the second extruder.

As the layered extrudate exits the die opening the layered composite is processed in exactly the same manner as in Example I.

EXAMPLE III

This example is illustrative of preparing a self-metering low peripheral speed single layer liquid retentive pad or roller employing plasticized gum stock elastomer as the resin and sodium nitrate as the void former. Basically, the procedure of Example I was followed with the following exceptions. By weight 85 parts of a polyurethane millable gum stock elastomer having a Mooney viscosity of between 20 and 40 and with a sulfur cure system added was mixed with 15 parts of coumarone-indene resin for plasticizing.

The sized particles are mixed with the plasticized gum stock elastomer in a Sigma Blade type mixer for 4 to 5 minutes keeping the temperature below 100° C. The mixed salt-elastomer composite is granulated in a mechanical blade chopper to a particle size convenient for use in the extruder. The extruder barrel temperature is maintained at 60°–71° C. and the extruder die is controlled at 88°–99° C. to avoid cross-linking. The die pressure is 5000 to 6000 psi.

The extrudate is severed as it exits the die opening in the same manner as in Example I. The severed parts are then conveyed to a forced hot air oven and the elastomeric polymer is cross-linked in the oven at 170°–177° C. for 12 to 15 minutes before leaching, drying and filling as shown in Example I.

EXAMPLE IV

This example is illustrative of a selfmetering high peripheral speed multi-layer liquid retentive pad or roller. A granulated composite mix for use as the reservoir layer of the pad or roller is produced as shown in Example III.

A second granulated composite mix for use as a metering layer is prepared as shown in Example III except that 80 parts of 400 mesh (to dimensions less than 38 microns) sodium nitrate and 20 parts of the same gum stock elastomer are used.

The composites are simultaneously extruded as shown in Example II with the exception that the conditions of Example III are employed to avoid cross-linking.

Subsequent severing, cross-linking, leaching, drying and filling are as indicated in Example III.

EXAMPLE V

This example is illustrative of producing a self-metering single layer liquid retentive ink pad on a tubular profile.

The process of Example I is followed for preparing the salt-resin composite. The composite is extruded from a co-extrusive extruder employing a nonelastomeric polyurethane resin with no salt in one portion to form the profile and the salt-resin composite in another second extruding hopper. The conditions and procedure as as given in Example II.

The roller with the single layer liquid retentive pad is cut into appropriate lengths, leached and dried. The pad is filled with ink employing the vacuum method. Hubs are attached to the roller as indicated in FIG. 6.

EXAMPLE VI

This example is illustrative of preparing a pad with raised indices. A self-metering multi-layer stamp pad is produced as follows. The process of Example II is followed exactly for producing a multilayered co-extruded composite. As the layered extrudate exits the die opening, it is severed into blanks to a size suitable for the desired stamp pad. The sized composite blanks can now be stored until required, whereupon they are compression molded to receive the desired characters or indicia.

A mold is prepared from a suitable material such as aluminum, stainless steel, bakelite matrix board, etc. having an engraved cavity with the desired stamp size dimensions and an engraved relief of the desired indicia height.

The layered composite blank is placed in the mold cavity with the metering layer in contact with the relief side of the mold. The mold is closed to compress the composite at 50–60 p.s.i. platen pressure for 15–30 seconds at 140°–148° C. to form the stamp into the fixed dimension of the mold cavity. The mold is then opened and the molded stamp is removed for cooling at ambient temperature.

After cooling, the stamp pad is leached, dried and filled in the same manner as in Example I. After filling, the pad is ready for mounting to the appropriate mounting apparatus such as holders and handles commonly used in the industry.

Although the invention has been described in considerable detail with reference to certain preferred embodiments thereof, it will be understood that variations and modifications can be effected within the spirit and scope of the invention as described above and as defined in the appended claims. What is claimed is:

1. A process for producing a pad capable of high liquid retention and self-metering of liquid from the pad comprising:
   I. mixing salt of a size of 2 to 450 microns with a polymeric material in a weight ratio of 2.5:1 to 10:1 salt to polymer;

II. heating the polymer to a molten state and dispersing the salt to form a salt-polymer composite;
III. feeding the composite to an extruder and extruding to desired shape, whereby a more dense skin portion is formed on the upper surface of the extruded polymer;
IV. cutting and finishing the extruded polymer to desired pad size;
V. leaching out the salt with solvent; and
VI. drying the extruded polymeric matrix to evaporate leaching solvent.

2. A process for producing a self-metering ink retentive printer comprising:
I. mixing salt of a size of 2 to 450 microns with a polymeric material in a weight ratio of 2.5:1 to 10:1 salt to polymer;
II. heating the polymer to a molten state and dispersing the salt to form a salt-polymer composite;
III. feeding the composite to an extruder and extruding to desired shape, whereby a more dense skin portion is formed on the upper surface of the extruded polymer;
IV. cutting and finishing the extruded polymer, to desired printer size;
V. leaching out the salt with solvent;
VI. drying the extruded polymeric matrix to evaporate leaching solvent; and
VII. impregnating the printer with ink.

3. A process for producing a self-metering ink-retentive printer comprising:
I. mixing salt of a size of 2 to 450 microns with a polymeric material in a weight ratio of 2.5:1 to 10:1, salt to polymer;
II. heating the polymer to a molten state and dispersing the salt in the molten polymer to form a salt-polymer composite;
III. feeding the composite to an extruder and extruding to desired shape;
IV. repeating Steps I and II to form additional composites and extruding onto the existing extruded polymer until the desired number of layers are constructed, wherein the density is greatest on the top layer and wherein the top layer has a pronounced skin portion on the surface;
V. cutting and finishing the extruded polymer to desired printer shape;
VI. leaching out the salts with solvent;
VII. drying the extruded polymer matrices to evaporate the leaching solvent;
VIII. impregnating the printer with ink.

4. A process of claim 2 wherein the salt-polymer composite is extruded onto a profile.

5. A process of claim 2 wherein ink retaining hubs are attached to the printer after Step VII.

6. A process of claim 3 wherein after Step V the printer is compression molded to impart desired configuration while retaining the density distribution of Step IV.

7. A process for producing a high-speed self-metering single layer ink retentive printer comprising:
I. mixing sodium nitrate salt of 2 to 38 microns with a polymeric elastomer in a weight ratio of from 4:1 to 8:1 salt to polymer;
II. heating at 60°–176° C. to disperse sodium nitrate in polymer and to form a salt-polymer composite;
III. feeding the composite to an extruder;
IV. extruding at an extruder barrel temperature of 48°–205° C. and an average die pressure of 4500–5000 p.s.i. with a screw design having a length to outer diameter ratio of 10:1 to 32:1 and a compression ratio of 1:1 to 5:1,
V. recovering the extruded composite at a die temperature of 65° to 205° C.;
VI. achieving a skin thickness of 40 to 50 microns on the extruded composite;
VII. cutting and finishing the extruded composite to desired printer size;
VIII. leaching out the sodium nitrate with hot water at 45° to 55° C.; and
IX. drying the extruded leached composite in a forced air oven at 45° to 95° C.

8. A process for producing a high-speed self-metering multi-layer ink retentive printer comprising:
I. mixing sodium nitrate salt of 2 to 450 microns with a polymeric elastomer in a weight ratio from 5:1 to 10:1 salt to polymer;
II. heating at 60° to 176° C. to disperse sodium nitrate in polymer and to form a salt-polymer composite;
III. feeding the composite to an extruder;
IV. extruding at 48° to 205° C. and an average die pressure of 4,000–5,000 p.s.i. with a screw design having a length to outer diameter ratio of 10:1 to 32:1 and a compression ratio of 1:1 to 5:1 to form a rigid extruded body;
V. mixing sodium nitrate salt of 2 to 38 microns with a polymeric elastomer in a weight ratio from 2.5:1 to 8:1 salt to polymer;
VI. heating at 60°–176° C. to disperse the sodium nitrate in the polymer and to form a second salt-polymer composite;
VII. feeding the second composite to the extruder;
VIII. extruding onto the first extruded body at 48° to 205° C. and an average die pressure of 4000 to 5000 p.s.i. with a screw design of length to diameter of 10:1 to 32:1 and a compression ratio of 1:1 to 5:1 to form a multi-layer extruded body;
IX. recovering the extruded multi-layered composite at a die temperature of 65° to 205° C.;
X. achieving a skin thickness of 40 to 50 microns on the second extruded polymer layer;
XI. cutting and finishing the multi-layer extruded body to desired printer size;
XII. leaching out the sodium nitrate with hot water at 45° to 55° C.;
XIII. drying the extruded leached body in a forced air oven at 45° to 95° C.

9. A process for producing low-speed self-metering single layer ink retentive printer comprising:
I. mixing sodium nitrate salt of 2 to 450 microns with a polymeric elastomer in a weight ratio from 5:1 to 10:1 salt to polymer;
II. heating at 60°–176° C. to disperse sodium nitrate in polymer and to form a salt-polymer composite;
III. feeding the composite to an extruder;
IV. extruding at 48° to 205° C. and an average die pressure of 4,000–5,000 p.s.i. with a screw design of length to outer diameter of 10:1 to 32:1 to form an extruded composite;
V. recovering the extruded composite at a die temperature of 65° to 205° C.;
VI. achieving a skin thickness of 40 to 50 microns on the extruded composite;
VII. cutting and finishing the extruded composite to desired printer size;
VIII. leaching out the sodium nitrate with hot water at 45° to 55° C.;

10. A process for producing a low-speed self-metering multi-layer ink retentive printer comprising:
  I. mixing sodium nitrate salt of 2 to 450 microns with a polymeric elastomer in a weight ratio from 5:1 to 10:1 salt to polymer;
  II. heating at 60°–176° C. to disperse sodium nitrate in polymer and to form a salt-polymer composite;
  III. feeding the composite to an extruder;
  IV. extruding at 48° to 205° C. and an average pressure of 4,000 to 5,000 p.s.i. with a screw design of length to outer diameter of 10:1 to 32:1 to form a rigid extruded body;
  V. mixing sodium nitrate salt of 74 to 150 microns with a polymeric elastomer in a weight ratio from 4:1 to 8:1 salt to polymer to form a second salt-polymer composite;
  VI. feeding the second composite to an extruder;
  VII. extruding the second composite onto the first extruded body at 48° to 205° C. and an average die pressure of 4,000 to 5,000 p.s.i. with a screw design of length to outer diameter of 10:1 to 32:1 and a compression ratio of 1:1 to 5:1 to form a multi-layer extruded body;
  VIII. achieving a skin thickness of 40 to 50 microns on the multi-layer extruded body;
  IX. cutting and finishing the multi-layer extruded body to desired printer size;
  X. leaching out the sodium nitrate with hot water at 45° to 205° C.
  XI. drying the multi-layer extruded body in a forced air oven at 45° to 95° C.

11. A multi-layer ink printer comprising in combination:
  A. an extruded microporous polymer layer;
  B. an outer skin portion of the extruded microporous polymer layer with channels and pores of a size smaller than the channels and pores of the microporous polymer layer integral therewith;
  C. a second additional extruded porous polymer layer connected to the underside of the first microporous polymer layer so that the channels and the pores of the second layer are of a size greater than the size of the pores in the first layer and wherein the density of the layers is greatest at the skin portion and decreases with the cross section; and this second layer is extruded onto a solid profile and
  D. ink contained in the channels and pores of both layers self-metering in use.

12. A process for producing an extruded salt-filled polymeric material of consistant density comprising:
  I. mixing salt of a size of 2 to 450 microns with a polymeric material in a weight ratio of 2.5:1 to 10:1, salt to polymer;
  II. heating the polymer to a molten state and dispersing the salt to form a salt-polymer composite;
  III. feeding the composite to an extruder and extruding to a desired shape, whereby a more dense skin portion is formed on the upper surface of the extruded polymer.

13. An ink printer comprising in combination:
a pad composed of
  A. a microporous polymer layer integral with a skin portion but with channels and pores larger than the outer skin portion;
  B. an outer skin portion of an extruded microporous polymer layer wherein the density is greatest at the skin portion
wherein said pad is produced by the steps of:
  I. mixing salt of a size of 2 to 450 microns with a polymeric material in a weight ratio of 2.5:1 to 10:1 salt to polymer;
  II. heating the polymer to a molten state and dispersing the salt to form a salt-polymer composite;
  III. feeding the composite to an extruder and extruding to desired shape, whereby a more dense skin portion is formed on the upper surface of the extruded polymer;
  IV. cutting and finishing the extruded polymer to desired pad size;
  V. leaching out the salt with solvent; and
  VI. drying the extruded polymeric matrix to evaporate leaching solvent and
  C. ink contained in the channels and pores of said layers.

14. A multi-layer ink printer comprising in combination:
  A. an extruded microporous polymer layer;
  B. an outer skin portion of the extruded microporous polymer layer with channels and pores of a size smaller than the channels and pores of the microporous polymer layers integral therewith;
  C. at least one additional extruded porous polymer layer connected to the underside of the first microporous polymer layer so that the channels and the pores of the second layer connect with the channels and the pores of the first layer and wherein the pores and channels of the second layer are of a size greater than the size of the pores in the first layer and wherein the density of the layers is greatest at the skin portion and decreases with the cross section; and
wherein said pad is produced by the steps of:
  I. mixing salt of a size of 2 to 450 microns with a polymeric material in a weight ratio of 2.5:1 to 10:1, salt to polymer;
  II. heating the polymer to a molten state and dispersing the salt in the molten polymer to form a salt-polymer composite;
  III. feeding the composite to an extruder and extruding to desired shape;
  IV. repeating Steps I and II to form at least one additional composite and extruding it onto the existing extruder polymer until the desired number of layers are constructed, wherein the density is greatest on the top layer and wherein the top layer has a pronounced skin portion on the surface;
  V. cutting and finishing the extruded polymer to desired printer shape;
  VI. leaching out the salts with solvent;
  VII. drying the extruded polymer matrices to evaporate the leaching solvent; and
  D. ink contained in the channels and pores of all layers selt-metering in use.

* * * * *